United States Patent
Escudero Rodriguez et al.

(10) Patent No.: US 11,799,387 B2
(45) Date of Patent: Oct. 24, 2023

(54) SYNCHRONOUS RECTIFIER CONTROLLER AND RELATED SENSING CIRCUITRY FOR SERIES-PARALLEL RESONANT CONVERTERS

(71) Applicant: Infineon Technologies Austria AG, Villach (AT)

(72) Inventors: Manuel Escudero Rodriguez, Villach (AT); Matteo-Alessandro Kutschak, Ludmannsdorf (AT)

(73) Assignee: Infineon Technologies Austria AG, Villach (AT)

( * ) Notice: Subject to any disclaimer, the term of this patent is extended or adjusted under 35 U.S.C. 154(b) by 107 days.

(21) Appl. No.: 17/512,104

(22) Filed: Oct. 27, 2021

(65) Prior Publication Data

US 2023/0131297 A1    Apr. 27, 2023

(51) Int. Cl.
*H02M 3/335*    (2006.01)
*H02M 1/00*    (2006.01)

(52) U.S. Cl.
CPC ..... *H02M 3/33592* (2013.01); *H02M 1/0009* (2021.05)

(58) Field of Classification Search
CPC .............. H02M 3/33592; H02M 3/01; H02M 3/33576; H02M 3/33569; H02M 1/4241; H02M 1/0032; H02M 3/3353
See application file for complete search history.

(56) References Cited

U.S. PATENT DOCUMENTS

| | | | | |
|---|---|---|---|---|
| 2012/0287680 | A1* | 11/2012 | Luo | H02M 3/33592 |
| | | | | 363/21.02 |
| 2017/0025969 | A1* | 1/2017 | Xu | H02M 3/33592 |
| 2020/0195160 | A1* | 6/2020 | Mayell | H02M 3/33592 |
| 2021/0184588 | A1* | 6/2021 | Chen | H02M 3/33592 |

OTHER PUBLICATIONS

"11 kW bi-directional CLLC DC-DC converter with 1200 V and 1700 V CoolSiC™ MOSFETs", Infineon User Guide, UG-2020-31, Revision 1.1, Nov. 3, 2020, pp. 1-55.

(Continued)

*Primary Examiner* — Alex Torres-Rivera
(74) *Attorney, Agent, or Firm* — Murphy, Bilak & Homiller, PLLC

(57) ABSTRACT

The primary side of an LLC converter includes a primary-side switch network connected to an LLC network having a first winding of an isolation transformer. The secondary side includes a secondary-side switch network having first and second rectification branches coupled to different tap points of a second winding of the isolation transformer. Switching of the secondary-side switch network is controlled based on a drive signal and a current sense signal indicative of current in the rectification branches. For a first part of each switching cycle, discontinuous conduction mode (DCM) is detected based on a falling edge of the current sense signal occurring before a falling edge of the drive signal for the first rectification branch. For a second part of each switching cycle, DCM is detected based on the falling edge of the current sense signal occurring before a falling edge of the drive signal for the second rectification branch.

20 Claims, 12 Drawing Sheets

(56) References Cited

OTHER PUBLICATIONS

"Advanced Synchronous Rectifier Controller for LLC Resonant Converter", NCP4318, ON Semicondutor, www.onsemi.com, Publication Order No. NCP4318/D, Revision 3, Jun. 2021, pp. 1-22.

"SmartRectifier Control IC", Infineon SMPS IC SmartRectifier IR1161LPBF, Jul. 1, 2016, pp. 1-26.

Chen, Rui, et al., "11 kW High-efficiency bidirectional CLLC converter with 1200 V SiC MOSFET", PCIM Asia 2021, Shenzhen, China, ISBN 978-3-8007-5620-9, VDE VERLAG GMBH—Berlin—Offenbach, Sep. 9-11, 2021, pp. 40-48.

Escudero, Manuel, et al., "High Efficiency, Narrow Output Range and Extended Hold-Up Time Power Supply with Planar and Integrated Magnetics for Server Applications", PCIM Europe digital days, ISBN 978-3-8007-5515-8, VDE VERLAG GMBH—Berlin—Offenbach, May 3-7, 2021, pp. 1179-1186.

Kim, Bong-Chul, et al., "The Novel Synchronous Rectifier Driving Method for LLC Series Resonant Converter", IEEE, IECON 2012—38th Annual Conference on IEEE Industrial Electronics Society, 2012, pp. 810-813.

Lazar, James F., et al., "Steady-State Analysis of the LLC Series Resonant Converter", APEC 2001. Sixteenth Annual IEEE Applied Power Electronics Conference and Exposition (Cat. No. 01CH37181), 2001, pp. 728-735.

Trosman, Yevgeniy, et al., "3600 W, 385 V to 52 V LLC DC-DC CoolGaN™ demo board using IGT60R070D1 e-Mode CoolGaN™ (600 V, 70 mΩ max)", User Guide UG_201702_PL52_013, Order code: EVAL_3K6W_LLC_GAN, www.infineon.com/GaN, Revision 1.0, May 2, 2018, pp. 1-80.

Yu, Ruiyang, et al., "Computer-Aided Design and Optimization of High-Efficiency LLC Series Resonant Converter", IEEE Transactions on Power Electronics, vol. 27, No. 7, Jul. 2012, pp. 3243-3256.

Yu, Ruiyang, et al., "High-frequency and high-density design of all GaN power supply unit", PCIM Europe 2018; International Exhibition and Conference for Power Electronics, Intelligent Motion, Renewable Energy and Energy Management, 2018, pp. 1-5.

\* cited by examiner

SYNCHRONOUS RECTIFIER CONTROLLER AND RELATED SENSING CIRCUITRY FOR SERIES-PARALLEL RESONANT CONVERTERS

BACKGROUND

A series-parallel resonant converter, commonly referred as an LLC converter, is an isolated converter with a resonant network that includes an equivalent series inductor (L), an equivalent parallel inductor (L) and an equivalent series capacitor (C). An LLC converter can be divided into two sides separated by the main transformer, for stepping down the voltage and providing insulation between the primary or input side and the secondary or output side. The primary side can be a half-bridge or a full-bridge, which generates a square wave at a variable frequency and generally at a 50% duty cycle although other modulations are possible.

The resonant tank, which is generally placed on the primary side of the LLC converter, includes a series inductor, a parallel inductor, and a series capacitor. An advantage of this topology is that several of the resonant elements can be implemented by parasitics of the transformer itself, e.g., the series resonant inductor with the leakage of the transformer (Llkg) and the parallel inductor with the magnetizing inductance (Lm) of the transformer. The large signal gain of the LLC converter can be adjusted by varying the switching frequency (Fsw) around the series resonant frequency of the resonant tank (Fr). While switching at Fr, the large signal gain is ideally one. However, by switching at frequencies lower than Fr, the large signal gain becomes larger than one (boost operation). Conversely, by switching at frequencies higher than Fr, the large signal gain becomes lower than one (buck operation). The boost and buck modes of operation are represented by the following formulas:

$$F_r = \frac{1}{2\pi\sqrt{L_r C_r}} \quad (1)$$

$$F_{sw} > F_r \xrightarrow{yields} \text{Buck} \quad (2)$$

$$F_{sw} < F_r \xrightarrow{yields} \text{Boost} \quad (3)$$

The secondary side of the LLC converter rectifies and filters the output of the transformer. Many configurations are possible, e.g., center-tapped, full-bridge, voltage-doubler, etc. depending on the specific application. For high current outputs, the efficiency of the LLC converter can be improved with active rectification, commonly referred as synchronous rectification (SR). The secondary side rectifiers not only use passive diodes but are actively switched to decrease the forward voltage drop.

However, the control of the SR in LLC converters is not straightforward due to the nature of the converter and its several modes of operation. The most common operation modes in commercial power supplies are the CCMA (Continuous Conduction Mode A), DCMB (Discontinuous Conduction Mode B), DCMAB and DCMA. Some modes result in hard commutation of the primary side devices and high current and voltage stress on the resonant capacitors.

Some characteristics of the SRs conduction time are as follows. The primary side transition and the secondary side current rise are not necessarily aligned. Therefore, the turn-on of the SRs cannot be synchronized to the primary side signals in all operating conditions. The primary side transition and the secondary side current fall also are not necessarily aligned. Therefore, the turn-off of the SRs cannot be synchronized to the primary side signals in all operating conditions. Also, LLC converters move between the different operation modes depending on the input voltage, the output voltage, the load, and the switching frequency. Moreover, while operating in any of the CCMA or in the DCMA modes, the shift of the turn-off of the current in the SRs also depends on the size of the series inductor, which has certain production tolerances.

Therefore, an accurate control of the SRs should be based on direct or indirect sensing of the conduction of the devices. Estimation methods based on online or offline calculated timings are in general neither accurate nor optimized along mass produced converters or along all the operating conditions.

The most common methods for the sensing and control of the SRs in resonant LLC converters include voltage sensing and current sensing techniques. The voltage sensing techniques are implemented by measuring the voltage drop of the diode before turning on, and detecting the decrease in the voltage drop of the channel resistance ($R_{ds,on}$) for the turn-off. The main drawbacks of this technique are as follows. The error due to the inductance along the sensing point, which causes early turn-off, is most severe while working above resonance, due to the higher di/dt in this operation mode. Also, the technique does not work well for very low $R_{ds,on}$ rectifiers and can be easily miss-triggered while operating under resonance if the DCM resonance amplitude is high enough to touch the opposite voltage rail.

Some adaptive algorithms try to correct the above-mentioned drawbacks of the voltage sensing techniques. Some controllers apply a pull-down to the SRs gate to increase the $R_{ds,on}$ and partly correct the inductive drop with increased drop in the channel, and therefore, additional losses. So-called smart implementations apply an adaptive scheme measuring the effective dead-times and correct it iteratively in the following switching cycles. This is usually done only for the turn-off transition. The turn-off threshold can be increased artificially for performing the previously mentioned correction, although this approach is still partly sensitive to the drawbacks listed before, e.g., difficult to select the maximum virtual turn-off threshold allowed and depending on the inductance of the circuit and the maximum di/dt that could vary greatly, and requires several switching cycles for the adaptation while changing between operation modes.

Among current sensing techniques, some aim to directly measure the current passing through the rectifiers. While this would give the most accurate results, it complicates the layout and sensing, because the sensed path usually conducts the largest rms (root mean square) currents. For example, some direct current sensing methods require a Rogowski coil to surround the secondary side PCB (printed circuit board) before the rectification stage. Another method is based on the current through the primary side of the converter—the lowest current path in a step-down converter. However, this approach requires reconstruction of the magnetizing current that needs to be subtracted from the sensed current.

Another approach involves an implementation of the secondary side current with a current sense transformer, where the secondary side current is not that large because the application has a high-voltage output. This implementation also includes blanking logic based on the primary side gate driving signals, which is however incomplete to account for the several working modes of the LLC converter in wide range applications.

Thus, there is a need for improved sensing and control of SRs in resonant LLC converters.

SUMMARY

According to an embodiment of an LLC converter, the LLC converter comprises: a primary side coupled to a secondary side by an isolation transformer, the primary side comprising a primary-side switch network connected to an LLC network, the LLC network including a first winding of the isolation transformer, the secondary side comprising a secondary-side switch network having a first rectification branch and a second rectification branch coupled to different tap points of a second winding of the isolation transformer; a primary-side controller configured to control switching of the primary-side switch network; and a secondary-side controller configured to control switching of the secondary-side switch network, based on a drive signal provided by the primary-side controller and a current sense signal indicative of current in the first rectification branch and the second rectification branch, wherein for a first part of each switching cycle for the secondary-side switch network and after the second rectification branch is switched off, the secondary-side controller is configured to switch on the first rectification branch in either discontinuous conduction mode (DCM) when a rising edge of the current sense signal exceeds a threshold or in continuous conduction mode (CCM) when a falling edge of the current sense signal drops below the threshold, wherein for a second part of each switching cycle for the secondary-side switch network and after the first rectification branch is switched off, the secondary-side controller is configured to switch on the second rectification branch in either DCM when the rising edge of the current sense signal exceeds the threshold or in CCM when the falling edge of the current sense signal drops below the threshold.

According to an embodiment of a secondary-side controller for an LLC converter, the secondary-side controller comprises: a first input configured to receive a drive signal from a primary-side controller of the LLC converter; a second input configured to receive a current sense signal indicative of current in a first rectification branch and a second rectification branch of a secondary-side switch network of the LLC converter; and a digital control circuit configured to control switching of the secondary-side switch network, based on the drive signal received at the first input and the current sense signal received at the second input, wherein for a first part of each switching cycle for the secondary-side switch network and after the second rectification branch is switched off, the digital control circuit is configured to switch on the first rectification branch in either discontinuous conduction mode (DCM) when a rising edge of the current sense signal exceeds a threshold or in continuous conduction mode (CCM) when a falling edge of the current sense signal drops below the threshold, wherein for a second part of each switching cycle for the secondary-side switch network and after the first rectification branch is switched off, the digital control circuit is configured to switch on the second rectification branch in either DCM when the rising edge of the current sense signal exceeds the threshold or in CCM when the falling edge of the current sense signal drops below the threshold.

According to another embodiment of an LLC converter, the LLC converter comprises: a primary side coupled to a secondary side by an isolation transformer, the primary side comprising a primary-side switch network connected to an LLC network, the LLC network including a first winding of the isolation transformer, the secondary side comprising a secondary-side switch network having a first rectification branch and a second rectification branch coupled to different tap points of a second winding of the isolation transformer; a primary-side controller configured to control switching of the primary-side switch network; and a secondary-side controller configured to control switching of the secondary-side switch network, based on a drive signal provided by the primary-side controller and a current sense signal indicative of current in the first rectification branch and the second rectification branch, wherein for a first part of each switching cycle for the secondary-side switch network, the secondary-side controller is configured to detect discontinuous conduction mode (DCM) based on a falling edge of the current sense signal occurring before a falling edge of the drive signal for the first rectification branch, wherein for a second part of each switching cycle for the secondary-side switch network, the secondary-side controller is configured to detect DCM for the second rectification branch based on the falling edge of the current sense signal occurring before a falling edge of the drive signal for the second rectification branch.

According to another embodiment of a secondary-side controller for an LLC converter, the secondary-side controller comprises: a first input configured to receive a drive signal from a primary-side controller of the LLC converter; a second input configured to receive a current sense signal indicative of current in a first rectification branch and a second rectification branch of a secondary-side switch network of the LLC converter; and a digital control circuit configured to control switching of the secondary-side switch network, based on the drive signal received at the first input and the current sense signal received at the second input, wherein for a first part of each switching cycle for the secondary-side switch network, the digital control circuit is configured to detect discontinuous conduction mode (DCM) based on a falling edge of the current sense signal occurring before a falling edge of the drive signal for the first rectification branch, wherein for a second part of each switching cycle for the secondary-side switch network, the digital control circuit is configured to detect DCM for the second rectification branch based on the falling edge of the current sense signal occurring before a falling edge of the drive signal for the second rectification branch.

Those skilled in the art will recognize additional features and advantages upon reading the following detailed description, and upon viewing the accompanying drawings.

BRIEF DESCRIPTION OF THE FIGURES

The elements of the drawings are not necessarily to scale relative to each other. Like reference numerals designate corresponding similar parts. The features of the various illustrated embodiments can be combined unless they exclude each other. Embodiments are depicted in the drawings and are detailed in the description which follows.

DETAILED DESCRIPTION

The embodiments described herein provide an improved current sensing technique for resonant LLC converters. Also described herein is a control algorithm for accurate driving of the SRs (synchronous rectifiers) in resonant LLC converters, which may use the improved current sensing technique described herein but can also be applied to other current sense methods. The general operation of the LLC converter will be described next, followed by the improved current sensing technique, followed by the SR control algorithm. The embodiments described herein provide an LLC controller with accurate control of the SR devices in any operating condition, for wide input and/or wide output converters. The embodiments described herein may be used various types of LLC converter applications, including high-efficiency resonant converters, particularly high frequency converters where the dead times of the SR devices may occupy a larger portion of the switching period and rectifiers with larger forward voltage drop of the intrinsic body diode. The circuitry and techniques described herein may be implemented in a standalone SR controller that may be combined with any other available LLC controller. The circuitry and techniques described herein may be included in a complete LLC controller including SR devices for wide input and wide output LLC converters.

Figure 1:
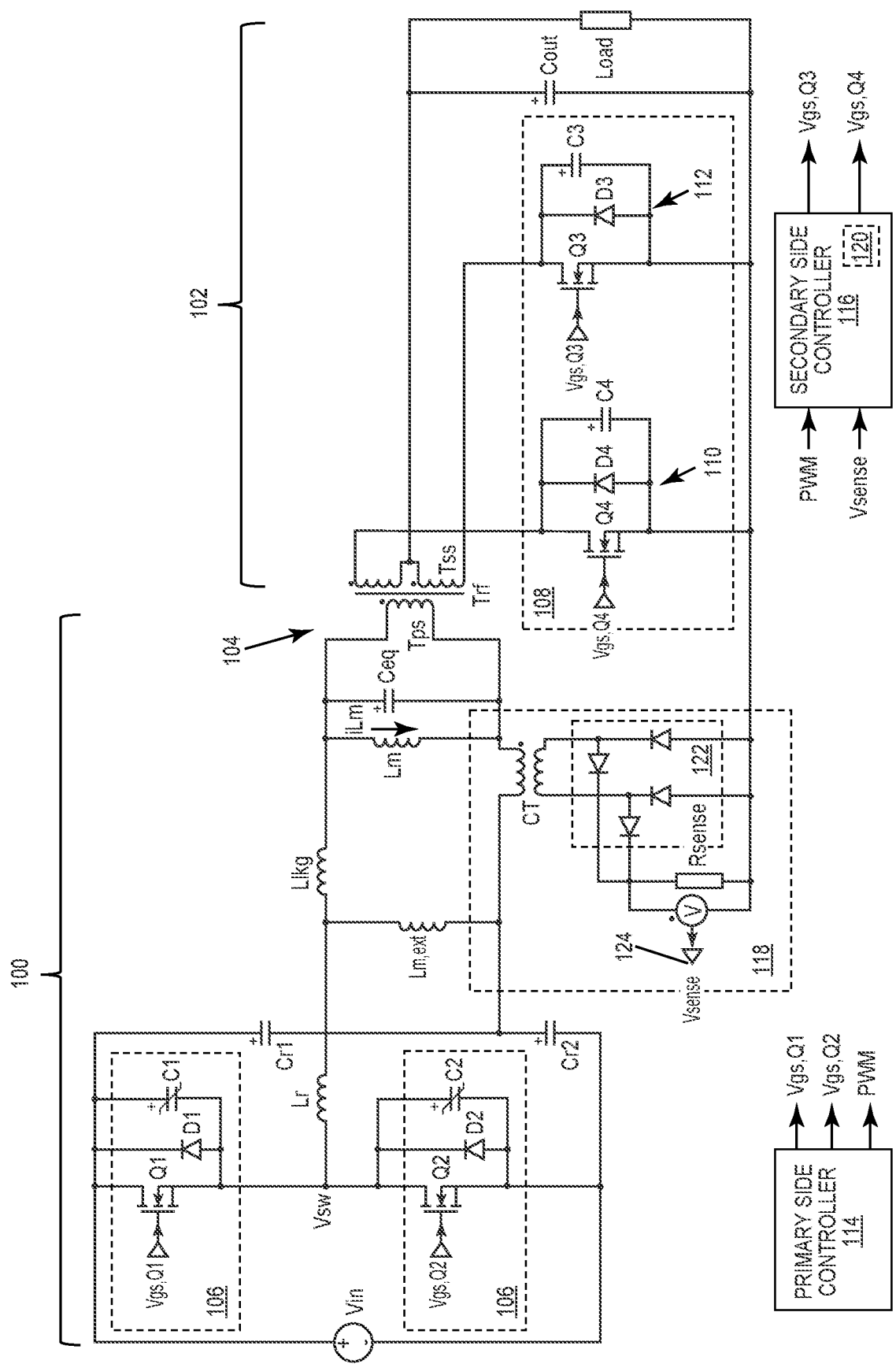
FIG. 1 illustrates a circuit schematic of an embodiment of an LLC converter.

FIG. 1 illustrates an embodiment of an LLC converter. The LLC converter includes a primary side 100 coupled to a secondary side 102 by an isolation transformer 104. The primary side 100 of the LLC converter includes a primary-side switch network 106 connected to an LLC network '$L_r$-$L_{m,ext}$-$L_{lkg}$-$L_m$-$C_{eq}/C_{r1,2}$-$T_{ps}$'. Several of the resonant elements of the LLC network $L_r$ $L_{m,ext}$-$L_{lkg}$-$L_m$-$C_{eq}/C_{r1,2}$-$T_{ps}$ may be implemented by parasitics of the isolation transformer 104. For example, the series resonant inductor of the LLC network $L_r$-$L_{m,ext}$-$L_{lkg}$-$L_m$-$C_{eq}/C_{r1,2}$-$T_{ps}$ may be implemented by the leakage 'Llkg' of the isolation transformer 104 and the parallel inductor of the LLC network $L_r$-$L_{m,ext}$-$L_{lkg}$-$L_m$-$C_{eq}/C_{r1,2}$-$T_{ps}$ may be implemented by the magnetizing inductance 'Lm' of the isolation transformer 104 which may include an external magnetizing inductance component 'Lm,ext'. The LLC network $L_r$-$L_{m,ext}$-$L_{lkg}$-$L_m$-$C_{eq}/C_{r1,2}$-$T_{ps}$ also includes a first winding $T_{ps}$ of the isolation transformer 104 and an equivalent series capacitor 'Ceq'.

The primary-side switch network 106 is illustrated as a half bridge comprising high-side switch device $Q_1$ and parallel coupled freewheeling diode D1 connected in series with low-side switch device $Q_2$ and parallel coupled freewheeling diode D2 at node Vsw to form a switching bridge. The node Vsw is connected to the LLC network $L_r$-$L_{m,ext}$-$L_{lkg}$-$L_m$-$C_{eq}/C_{r1,2}$-$T_{ps}$. In the case of a full bridge configuration, the primary-side switch network 106 would also include a second leg (not shown) of the switching bridge.

The secondary side 102 of the LLC converter includes a secondary-side switch network 108 having at least a first rectification branch 110 and a second rectification branch 112 coupled to different tap points of a second winding Tss of the isolation transformer 104. Those skilled in the art will readily understand that a different type of switch network may be used on the primary side 100 and/or secondary side 102 of the LLC converter such as, but not limited to, a full bridge, center-taped rectification stage, current doubler rectification stage, etc. Also, the switch devices $Q_1$, $Q_2$ on the primary side 100 of the LLC converter and the switch devices $Q_3$, $Q_4$ on the secondary side 102 of the LLC converter are illustrated as power MOSFETs each having a corresponding freewheeling diode $D_1$, $D_2$ and $D_3$, $D_4$ and parasitic capacitance $C_1$, $C_2$ and $C_3$, $C_4$. However, any suitable power transistor can be used for the switch devices $Q_1$, $Q_2$ on the primary side 100 and for the switch devices $Q_3$, $Q_4$ on the secondary side 102, such as but not limited to power MOSFETs, IGBTs (insulated gate bipolar transistors), HEMTs (high-electron mobility transistors), etc.

The LLC converter also includes a primary-side controller 114 for generating control signals Vgs,Q1, Vgs,Q2 that control switching of the respective switch devices $Q_1$, $Q_2$ included in the primary-side switch network 106, and a secondary-side controller 116 for generating control signals Vgs,Q3, Vgs,Q4 that control switching of the respective switch devices $Q_3$, $Q_4$ included in the secondary-side switch network 108. The primary-side controller 114 generates the gate signals Vgs,Q1, Vgs,Q2 so that the primary-side switch network 106 generates a square waveform from the input voltage 'Vin' to excite the LLC network $L_r$-$L_{m,ext}$-$L_{lkg}$-$L_m$-$C_{eq}/C_{r1,2}$-$T_{ps}$, which actively participates in determining the input-to-output power flow by outputting a resonant sinusoidal current that gets scaled and rectified by the isolation transformer 104 and the switch network 108 on the secondary side 102 of the LLC converter. The secondary-side controller 116 generates the gate signals Vgs,Q3, Vgs,Q4 so that the second-side switch network 108 rectifies the energy transferred over the isolation transformer 104. An output capacitor Cout filters the rectified current and outputs a DC voltage applied to the load.

The LLC converter may be operated in several DCM and CCM modes due to the multi-resonant nature of the converter. The LLC converter is 'multi-resonant' in that the configuration of the resonant tank may change within a single switching cycle. Depending on the input-to-output voltage ratio, the output load, and the characteristics of the resonant tank circuit, the secondary-side SR devices Q3, Q4 can be always conducting (with the exception of a single point in time), which is referred to as CCM (Continuous Conduction Mode), or there can be finite time intervals during which neither of the secondary-side SR devices Q3, Q4 is conducting, which is referred to as DCM (Discontinuous Conduction Mode). Different kinds of CCM and DCM operating modes are possible, including CCMA, DCMB, DCMAB and DCMA. For example, in DCMB (DCM below resonance), the LLC converter voltage conversion ratio M is larger than unity (M>1). In CCMA (CCM above resonance), M<1.

Regardless of the LLC converter mode of operation, the secondary-side controller 116 controls switching of the secondary-side switch network 108 based on a drive signal such as a PWM (pulse width modulation) signal provided by the primary-side controller 114 and a current sense signal 'Vsense' generated by current sense circuitry 118. The primary-side controller 114 may generate a single drive signal PWM and the secondary-side controller 116 may invert the single drive signal PWM to control both rectification branches 110, 112. The current sense signal Vsense is indicative of current in the first rectification branch 110 and the second rectification branch 112 on the secondary side 102. The current sense signal Vsense may be measured on the primary side 100 or on the secondary side 102 of the LLC converter but, e.g., without the magnetizing inductance component which can be subtracted with the proposed current measurement technique described herein or with another approach.

For a first part of each switching cycle for the secondary-side switch network 108 and after the second rectification branch 112 is switched off, the secondary-side controller 116 switches on the first rectification branch 110 in either DCM when a rising edge of the current sense signal Vsense exceeds a threshold Vcmp or in CCM when a falling edge of the current sense signal Vsense drops below the threshold Vcmp. For a second part of each switching cycle for the secondary-side switch network 108 and after the first rectification branch 110 is switched off, the secondary-side controller 116 switches on the second rectification branch 112 in either DCM when the rising edge of the current sense signal Vsense exceeds the threshold Vcmp or in CCM when the falling edge of the current sense signal Vsense drops below the threshold Vcmp.

Figure 2:
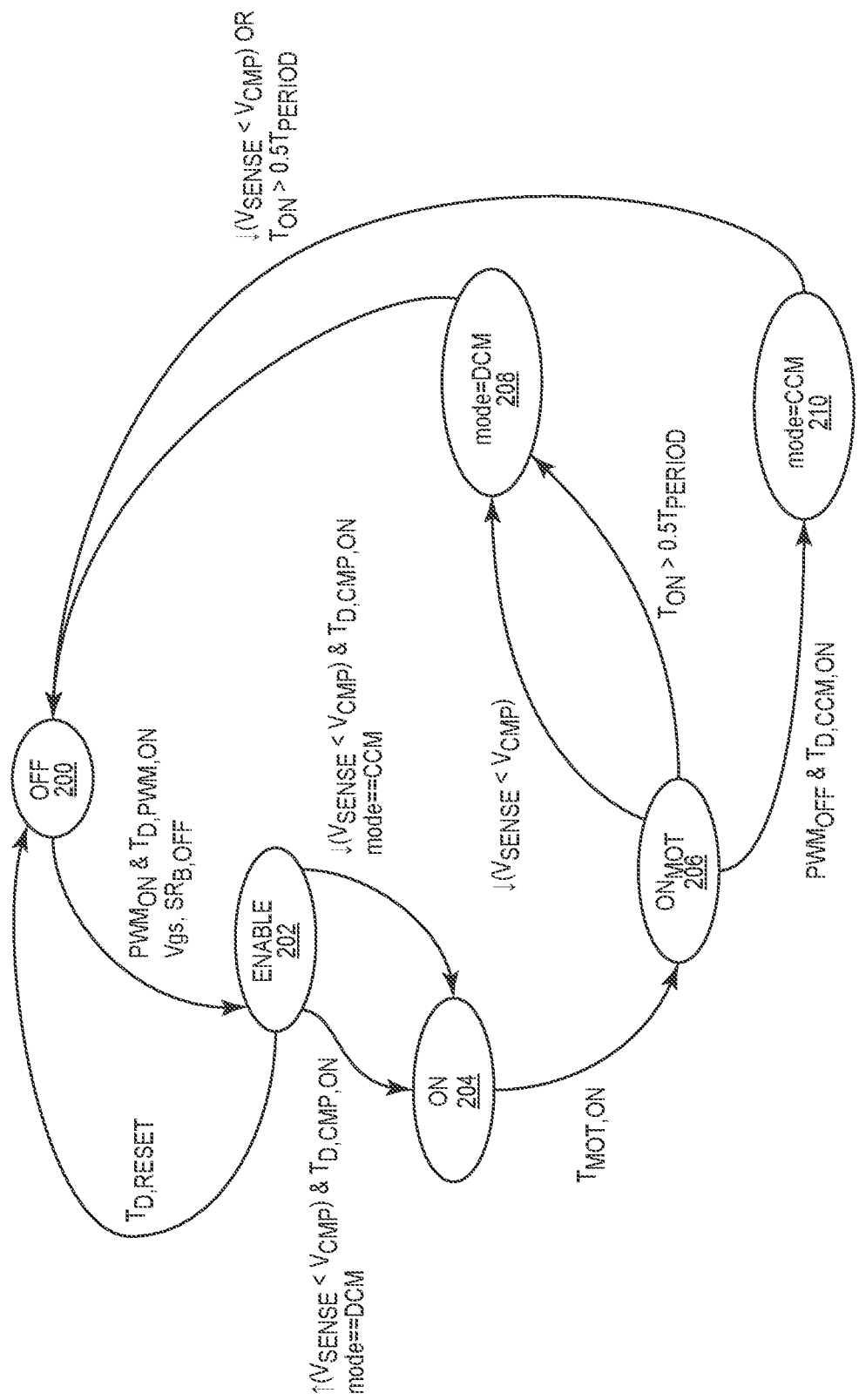
FIG. 2 illustrates a state diagram of an embodiment of a switching control algorithm implemented by a secondary-side controller of the LLC converter, for a first rectification branch on the secondary side.

FIG. 2 illustrates an embodiment of the switching control implemented by the secondary-side controller 116 for the first rectification branch 110 of the secondary-side switch network 108, for CCM and DCM. The first rectification branch 110 is off and the system is in a safe/known state (block 200). If the second rectification branch 112 is off (Vgs,SR$_{B,OFF}$), the drive signal PWM from the primary-side controller 114 is activated (PWM$_{ON}$), and after a delay from the drive signal activation (T$_{D,PWM,ON}$), the secondary-side controller 116 enters an enable state (block 202) in which the comparators for sensing falling/rising edges of the current sense signal Vsense are enabled. If no current is detected for some period of time (T$_{D,RESET}$), then the secondary-side controller 116 resets back to the safe/known state (block 200).

If within an allowed comparator window (T$_{D,CMP,ON}$) and a rising edge of current is detected ↑(Vsense>Vcmp) for the second rectification branch 112, the secondary-side controller 116 determines the LLC converter is in DCM (mode==DCM) and switches on the gate of Q4 via signal Vgs,Q4 (block 204). Otherwise, a falling edge of current ↓(Vsense<Vcmp) for the second rectification branch 112 causes the secondary-side controller 116 to determine that the LLC converter is in CCM (mode==CCM) and switches on the gate of Q4 via signal Vgs,Q4 (block 204). The mode==DCM or mode==CCM flag is reset each switching cycle so that the secondary-side controller 116 can determine whether the LLC converter is in DCM or CCM every switching cycle.

The secondary-side controller 116 enters state ON$_{MOT}$ after a minimum on time (T$_{MOT,ON}$) to mitigate against SR ringing in response to being switched (block 206). The minimum on time T$_{MOT,ON}$ ensures SR ringing does not affect the comparator output.

If Q4 is on for more than a predetermined amount of time such as more than half the total switching period (T$_{ON}$>0.5T$_{PERIOD}$), the current sensing is not functioning properly and Q4 should be turned off. Under this condition, the secondary-side controller 116 sets the mode flag for the first rectification branch 110 to DCM (block 208). The secondary-side controller 116 also sets the mode flag for the second rectification branch 112 to DCM if a falling edge of current ↓(Vsense<Vcmp) is detected (block 208). In both cases, the secondary-side controller 116 resets back to the safe/known state (block 200). If instead the drive signal PWM from the primary-side controller 114 is deactivated (PWM$_{OFF}$) and after a delay from the drive signal deactivation (T$_{D,CCM,ON}$), the secondary-side controller 116 sets the mode flag for the second rectification branch 112 to CCM (block 210). The secondary-side controller 116 resets back to the safe/known state if either a falling edge of current ↓(Vsense<Vcmp) is detected or after a predetermined amount of time has lapsed, e.g., T$_{ON}$>0.5T$_{PERIOD}$ (block 200).

Figure 3:
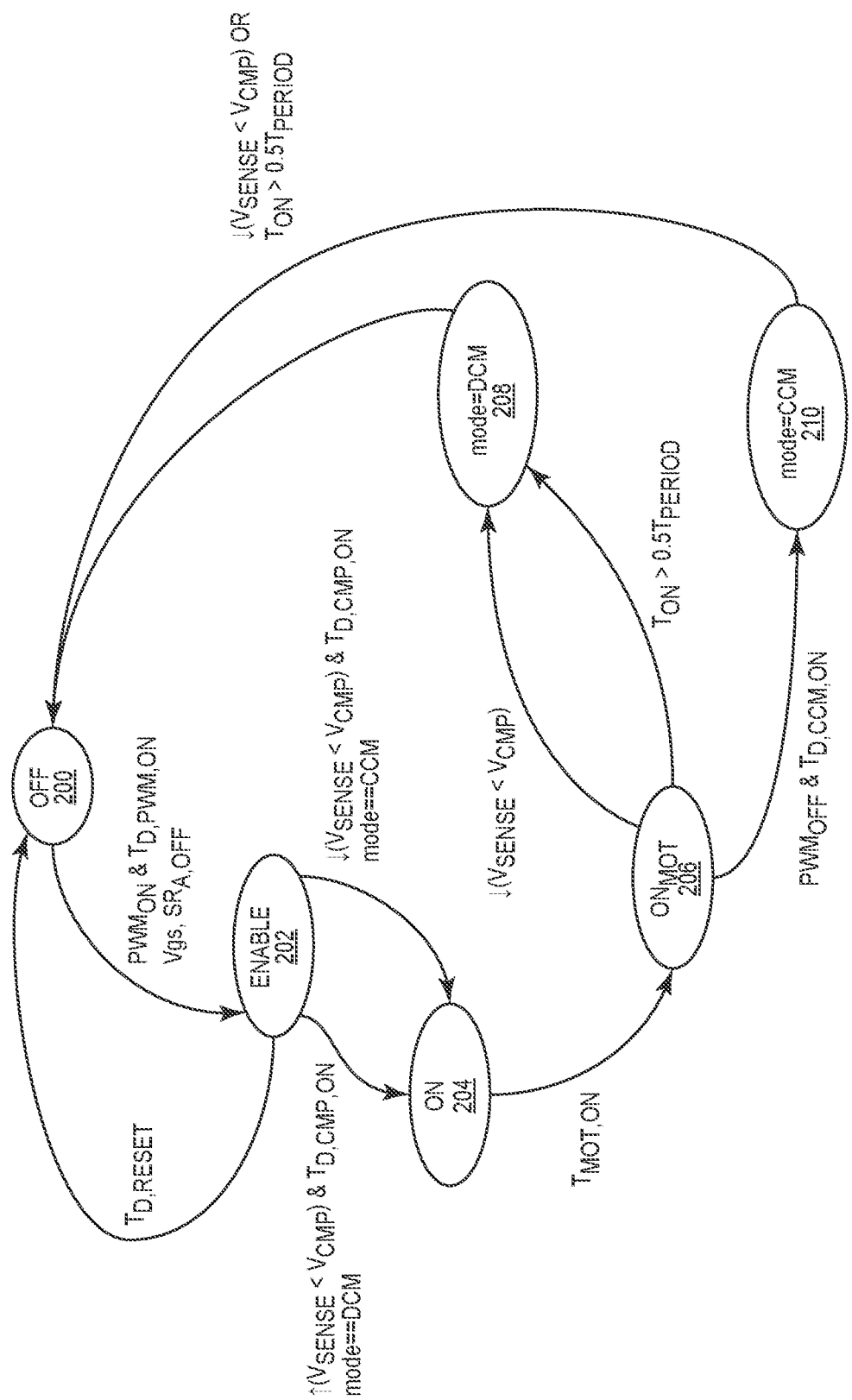
FIG. 3 illustrates a state diagram of an embodiment of a switching control algorithm implemented by the secondary-side controller of the LLC converter, for a second rectification branch on the secondary side.

FIG. 3 illustrates the same approach as FIG. 2, but for the second rectification branch 112 of the secondary-side switch network 108. The states for each of the rectification branches 110, 112 are the same, but utilize signals associated with the opposite branch, e.g., to avoid shoot-through and reset the enabling window.

With the approach described above and illustrated in FIGS. 2 and 3, if DCM is off (in CCM), the falling edge of current of the other rectification branch ↓(Vsense<Vcmp) is detected and the secondary-side controller 116 can predict CCM or DCM even before the current of the opposite branch comes. That is, the distinction between DCM and CCM operation is that in CCM the transition may be predicted employing the falling edge of the measured current ↓(Vsense<Vcmp) instead of the upcoming rising edge ↑(Vsense<Vcmp), therefore having faster reaction time which is beneficial in very high-frequency converters. The DCM/CCM prediction technique described herein gives advantages in time and a relaxation of the comparator requirements.

This approach provides an advantage in time, which is particularly beneficial in that the comparator speed requirement can be relaxed, by sensing the falling edge of the current of the other rectification branch. Accordingly, the secondary-side controller 116 need not wait for the rising edge of the current which comes late b/c the SRs are already conducting and have a delay in the comparison because the body diodes D3, D4 are conducting. By setting a CCM on or DCM on flag between states ENABLE (block 202) and ON (block 204), the secondary-side controller 116 predicts whether the LLC converter is in DCM when the falling edge of current of the other rectification branch ↓(Vsense<Vcmp) is detected before the end of the switching period. The secondary-side controller 116 updates the CCM on/DCM on flag every half period for both rectification branches 110, 112, hence two (2) states machines (FIG. 2 and FIG. 3) with 1 CCM/DCM on/off flag for each rectification branch 110, 112. Accordingly, a high-speed comparator (e.g., 10 ns comparator) is not required to predict CCM/DCM.

The secondary-side controller 116 may include or be any type of digital control circuit for implementing the state machines shown in FIGS. 2 and 3. For example, an ASIC (application-specific integrated-circuit) may be used with input from the primary-side controller 114. A standalone SR controller may implement the state machines shown in FIGS. 2 and 3 with input from the primary-side controller 114 (e.g., blanking window, DCM detection, etc.). Other implementation examples are a microcontroller or other type of general-purpose controller.

As shown in FIG. 1, the secondary-side controller 116 may include a comparator 120 for comparing the current sense signal Vsense with the threshold Vcmp. The comparator 120 is reset each switching cycle. For the first part of each switching cycle, the secondary-side controller 116 switches on the first rectification branch 110 in DCM in response to a rising edge ↑(Vsense<Vcmp) of the comparator output or in CCM in response to a falling edge ↓(Vsense<Vcmp) of the comparator output. For the second part of each switching cycle, the secondary-side controller 116 switches on the second rectification branch 112 in DCM in response to the rising edge ↑(Vsense<Vcmp) of the comparator output or in CCM in response to the falling edge ↓(Vsense<Vcmp) of the comparator output. The same comparator 120 may be used by the secondary-side controller 116 for detecting DCM or CCM for both the first rectification branch 110 and the second rectification branch 112, and the secondary-side controller 116 may reset the comparator 120 based on a change (on→off or off→on) in polarity in the PWM drive signal provided by the primary-side controller 114.

The comparator 120 may have an enable window that corresponds to the polarity of the PWM signal. The enable window may have a programmable delay after a change in the polarity of the PWM signal. The secondary-side controller 116 may blank the enable window to avoid shoot-through when transitioning from one of the rectification branches 110, 112 to the other one of the rectification branches 110, 112.

The secondary-side controller 116 may detect DCM for the first rectification branch 110 based on the falling edge of the current sense signal ↓(Vsense<Vcmp) occurring before a falling edge of the drive signal PWM for the first rectification branch 110, as indicated between states 202 and 204 in FIG. 2. The secondary-side controller 116 may similarly detect DCM for the second rectification branch 112 based on the falling edge of the current sense signal ↓(Vsense<Vcmp) occurring before a falling edge of the drive signal PWM for the second rectification branch 112, as indicated between states 202 and 204 in FIG. 3. The secondary-side controller 116 may track a resonance frequency of the LLC converter based on the DCM detection.

Again with respect to DCM detection, the comparator 120 on the secondary side 102 may be reset each time the PWM drive signal provided by the primary-side controller 114 changes polarity. The secondary-side controller 116 detects DCM for the first rectification branch 110 based on a falling edge ↓(Vsense<Vcmp) of an output of the comparator 120 occurring before the falling edge of the PWM drive signal for the first rectification branch 110. The secondary-side controller 116 similarly detects DCM for the second rectification branch 112 based on the falling edge ↓(Vsense<Vcmp) of the output of the comparator 120 occurring before the falling edge of the PWM drive signal for the second rectification branch 112. The secondary-side controller 116 resets the comparator 120 each switching cycle after the PWM drive signal provided by the primary-side controller 114 changes polarity. The secondary-side controller 116 may include or set a separate flag (mode==CCM; mode==DCM in FIGS. 2 and 3) for the first rectification branch 110 and the second rectification branch 112 and independently set the separate flag for each rectification branch 110, 112 to indicate if DCM is detected for that rectification branch 110, 112. The secondary-side controller resets detection of DCM or CCM if the current sense signal Vsense does not exceed the threshold Vcmp during a switching cycle.

The driving of the SR devices Q3, Q4 may be activated by the rising edge ↑(Vsense<Vcmp) of the comparator output, although the reaction window is improved using the falling edge ↓(Vsense<Vcmp) of the comparator output while in CCM, as described in the state machine of FIGS. 2 and 3. The comparator 120 compares the sensed current Vsense to an internal threshold Vcmp. The output of the comparator 120 sets the gate of the corresponding SR device Q3, Q4 during the window enabled by the corresponding polarity (on/off) of the primary-side PWM drive signal. Again, only a single comparator 120 is needed for both SR branches 110, 112 but separate comparators 120 may be used.

Figure 4:
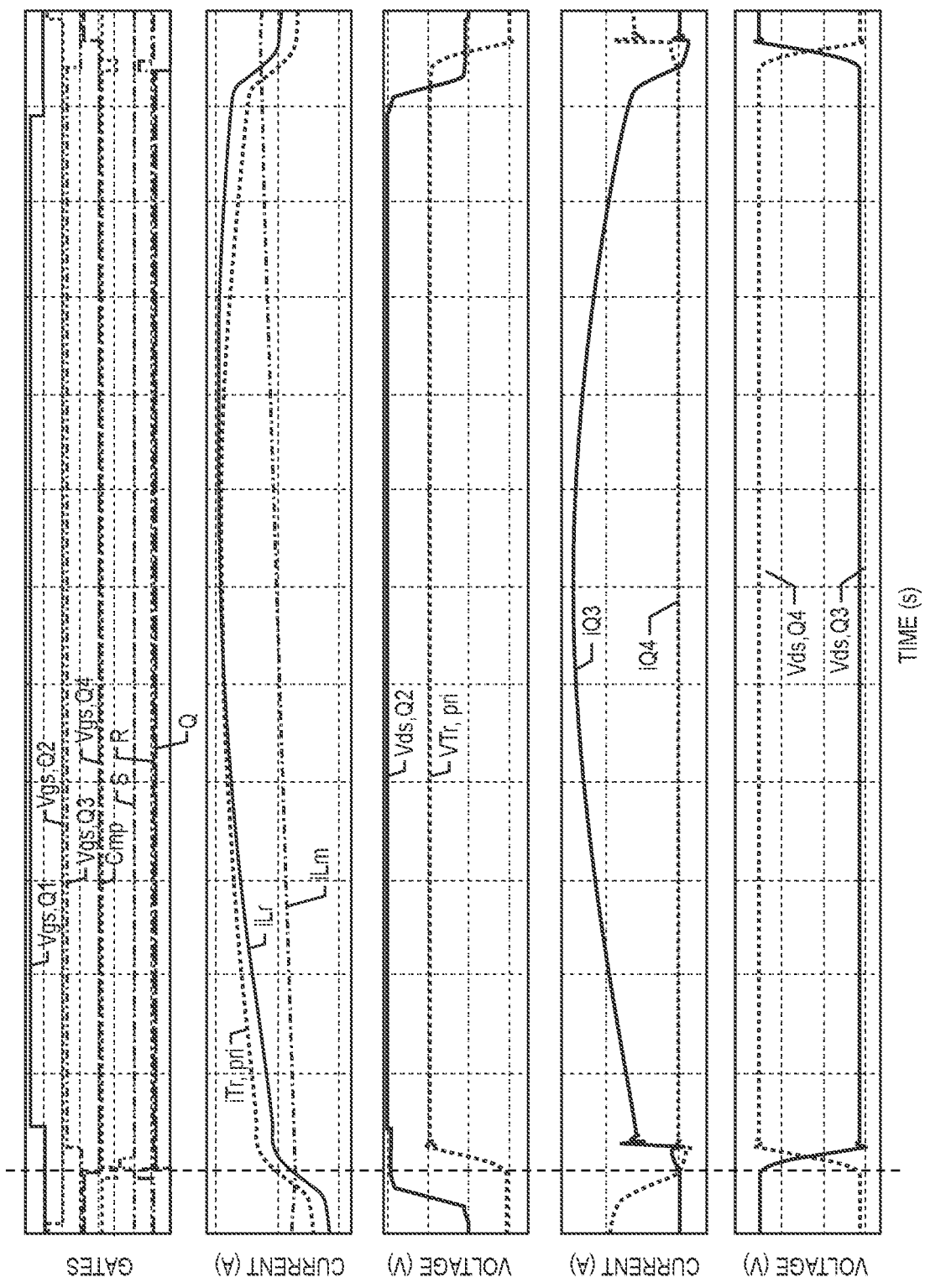
FIGS. 4 through 11 illustrate various plot diagrams that emphasize different operational aspects of the LLC converter.
Figure 5:
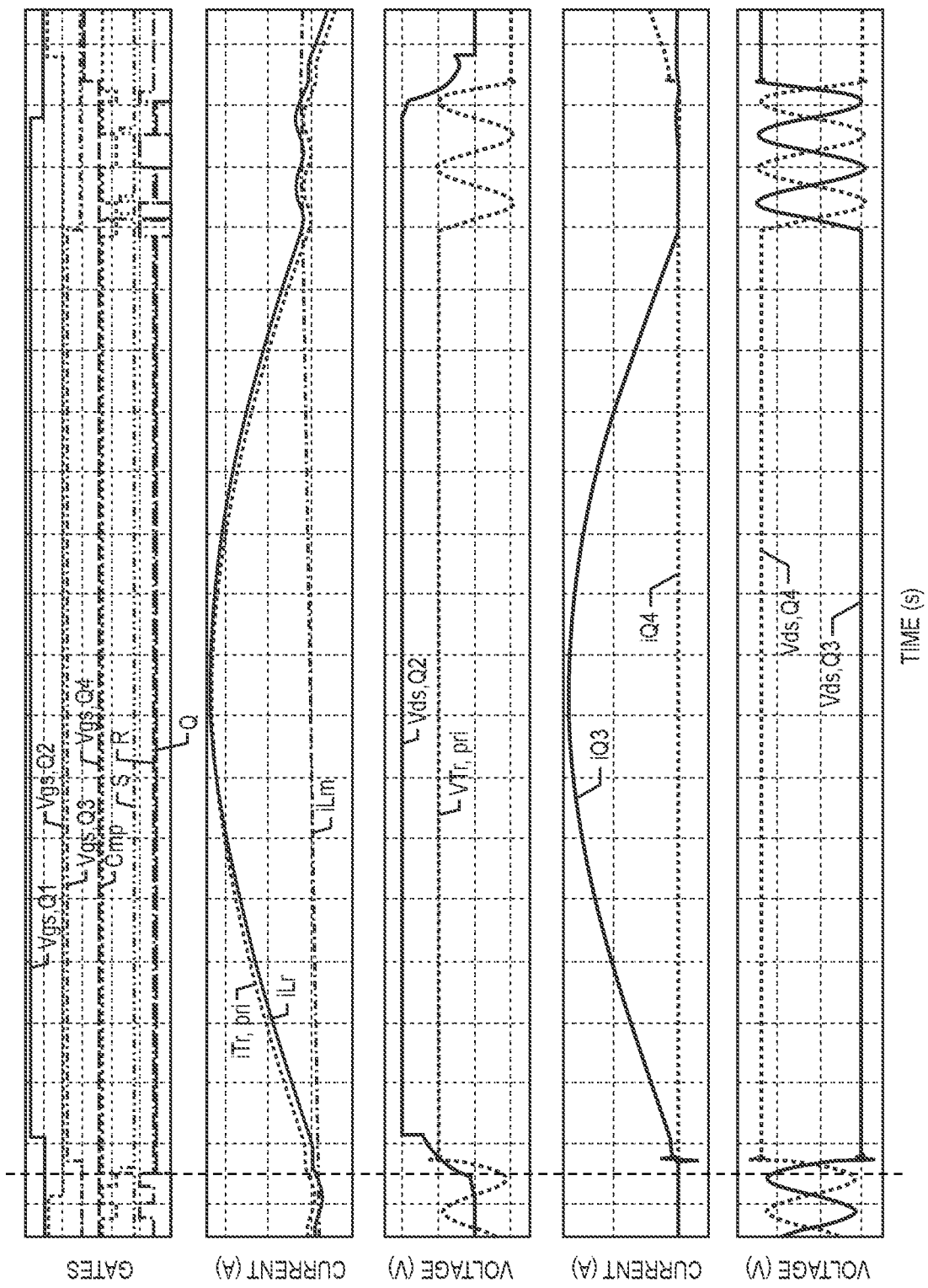

FIGS. 4 and 5 plot various parameters for the LLC converter, including the gate signals 'Vgs,Qx' for the switch devices Q1 through Q4, the output 'CMP' of the comparator 120, 'S' and 'R' inputs and 'Q' output of a latch for capturing the comparator output, current 'iLr' in the resonant inductance Lr of the LLC network $L_r$-$L_{m,ext}$-$L_{lkg}$-$L_m$-$C_{eq}/C_{r1,2}$-$T_{ps}$, the voltage 'vds,Q2' across switch device Q2, the voltage 'VTr,pri' across the primary-side winding Tps of the isolation transformer 104, current 'iQ3' in switch device Q3, current 'iQ4' in switch device Q4, the voltage 'vds,Q3' across switch device Q3, and the voltage 'vds,Q4' across switch device Q4. FIG. 4 illustrates the behavior of the rising edge detection for above-resonance operation mode whereas FIG. 5 illustrates the behavior of the rising edge detection for under-resonance operation mode. Multiple activation of the comparator 120 in the under-resonance operation mode (FIG. 5) does not enable the SR gate due to the limitation of single shot per half-period of the state machine. Comparator triggering is indicated by the vertical dashed line in FIGS. 4 and 5.

Figure 6:
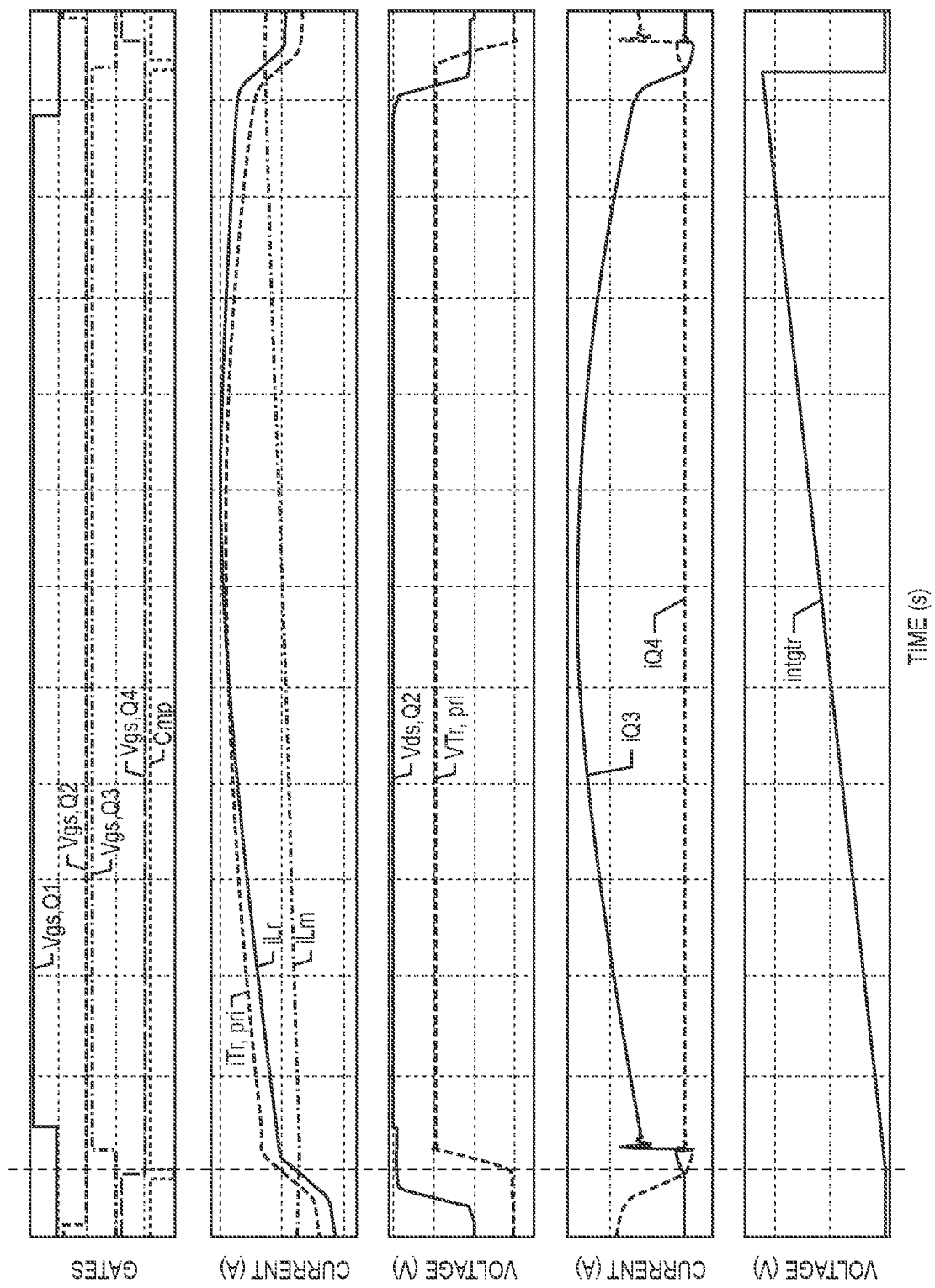
Figure 7:
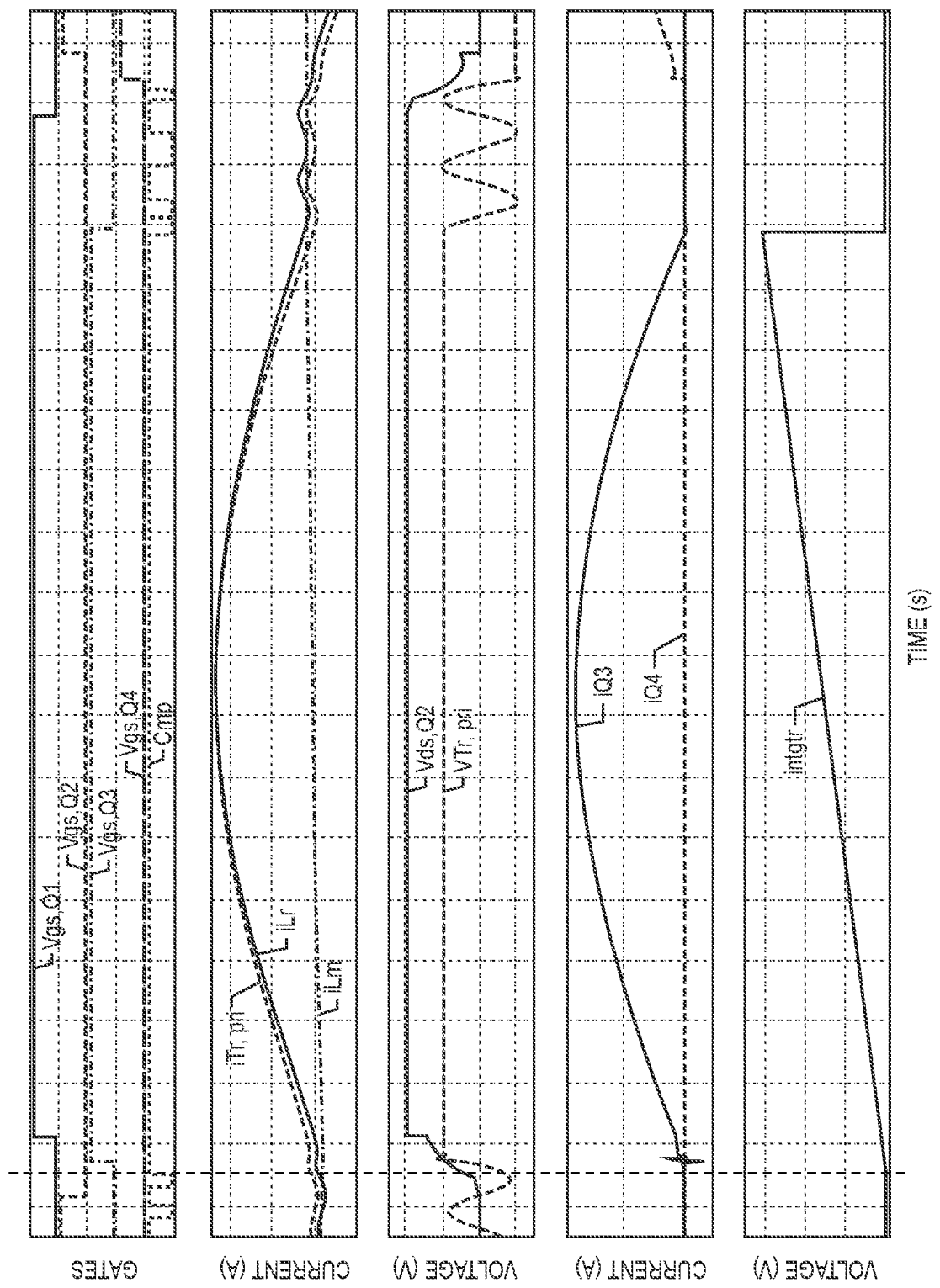

FIGS. 6 (above resonance) and 7 (under resonance) plot various parameters associated with the secondary-side controller 116 limiting the on time of the secondary-side SR devices Q3, Q4 to half the period of the respective primary side drive signals PWM. In any operation mode, the conduction time of the secondary-side SR devices Q3, Q4 should not be longer than the primary side half-period. Moreover, the conduction time is usually less than half the period, e.g., while working under series resonance. The maximum on time limitation may not trigger unless under abnormal conditions, e.g., as a protection mechanism The secondary-side controller 116 may use the DCM mode detection to track the actual resonance frequency of the LLC converter, e.g., while sweeping the switching frequencies and tracking the start of the DCM detection. Moreover, the secondary-side controller 116 may implement a minimum on time, e.g., for filtering of the current sense signal Vsense during the turn-on transient. Also, the single-shot functionality may be combined in the maximum and minimum pulse length logic of the secondary-side controller 116. The bottommost plot diagram in both FIGS. 6 and 7 shows operation of a maximum on time integrator block 'intgtr'.

Figure 8:
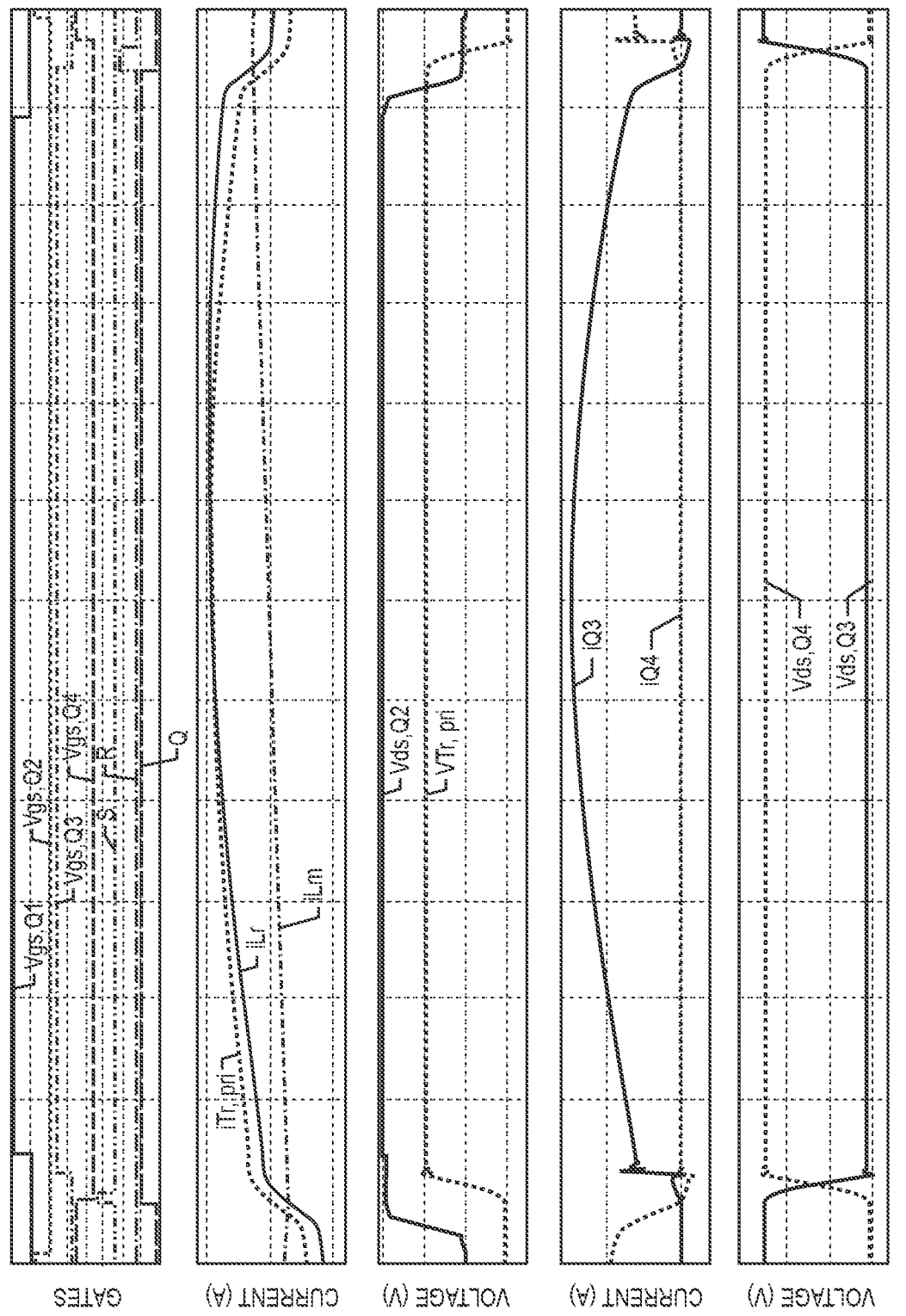
Figure 9:
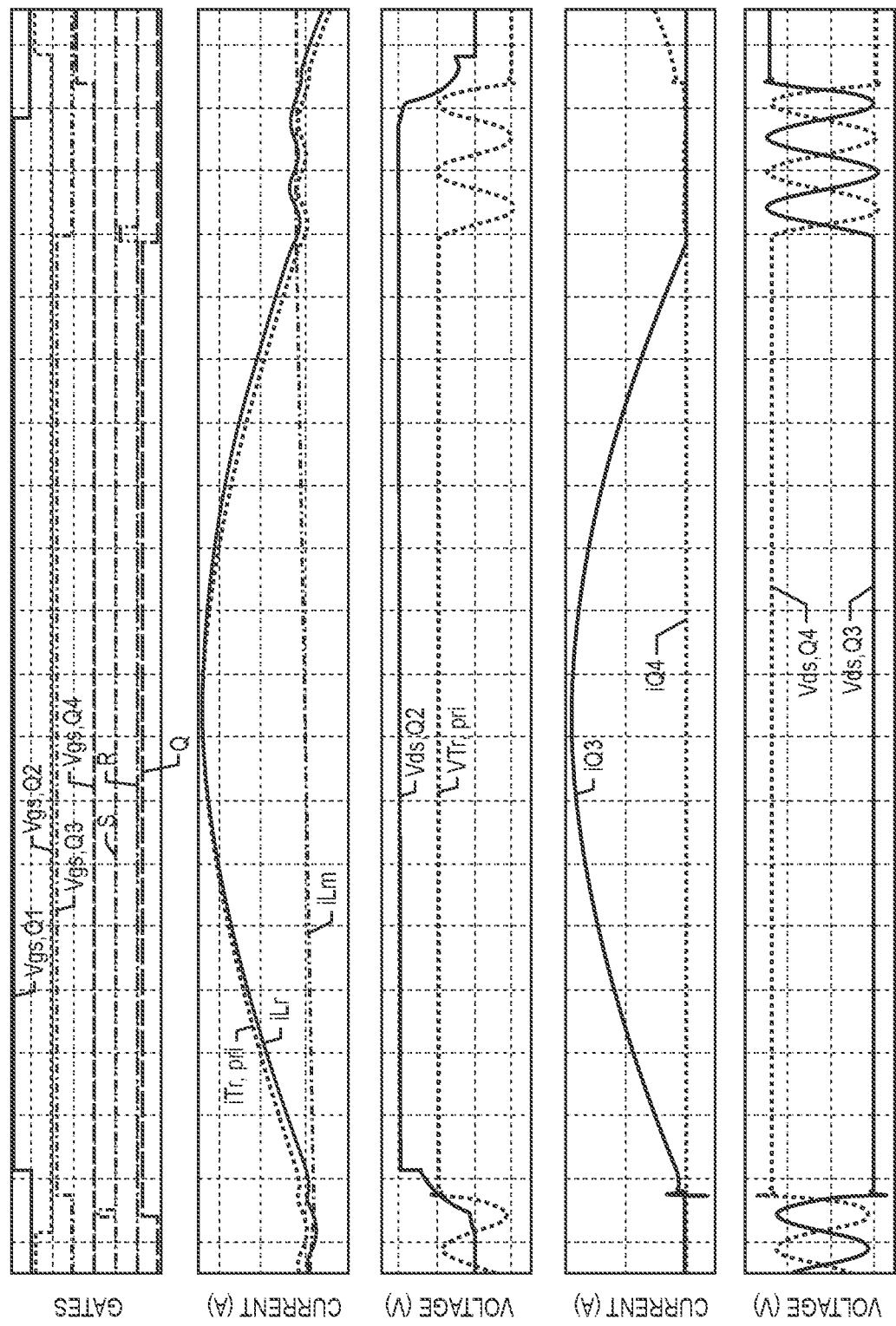

FIGS. 8 (above resonance) and 9 (under resonance) plot various parameters associated with the secondary-side controller 116 triggering of the gates of the SR devices Q3, Q4 being enabled only during the corresponding primary side PWM polarity. The window is slightly delayed by a configurable delay, to account for primary side driver and logic delays. The enable window is be blanked by the opposite SR branch gate, to avoid shoot-through. This is the case, for example, while operating above resonance (FIG. 8), where the secondary side current is shifted with respect to the primary side pulse driving signals. Only a single activation of the SR gates may be allowed per half-period of the primary-side driver signal PWM. Accordingly, the enable window is reset with the falling edge of the SR gate pulse itself. The secondary-side controller 116 may add a configurable delay at the output of the trigger logic and that accounts for the rising time of the drain voltage.

Figure 10:
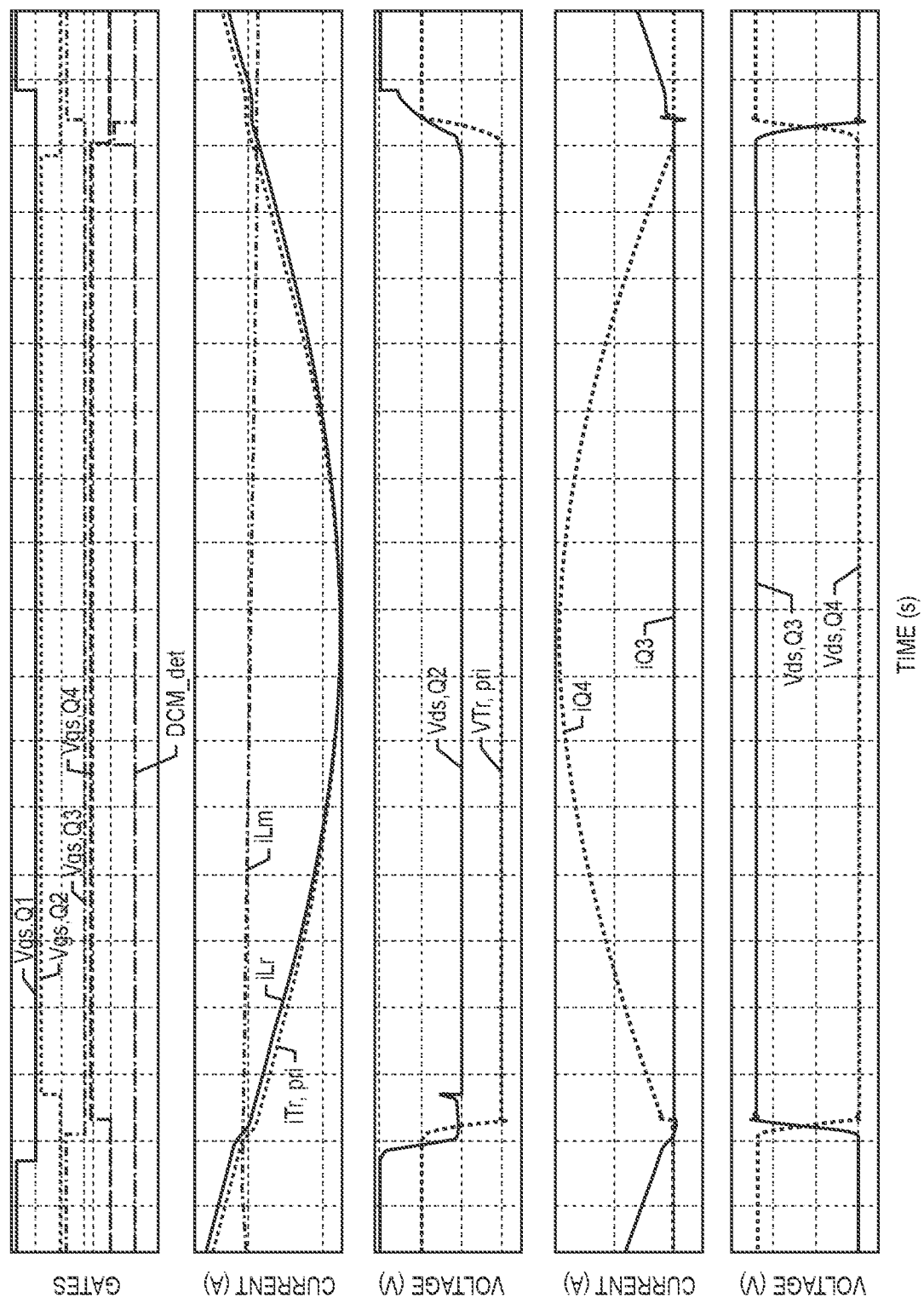
Figure 11:
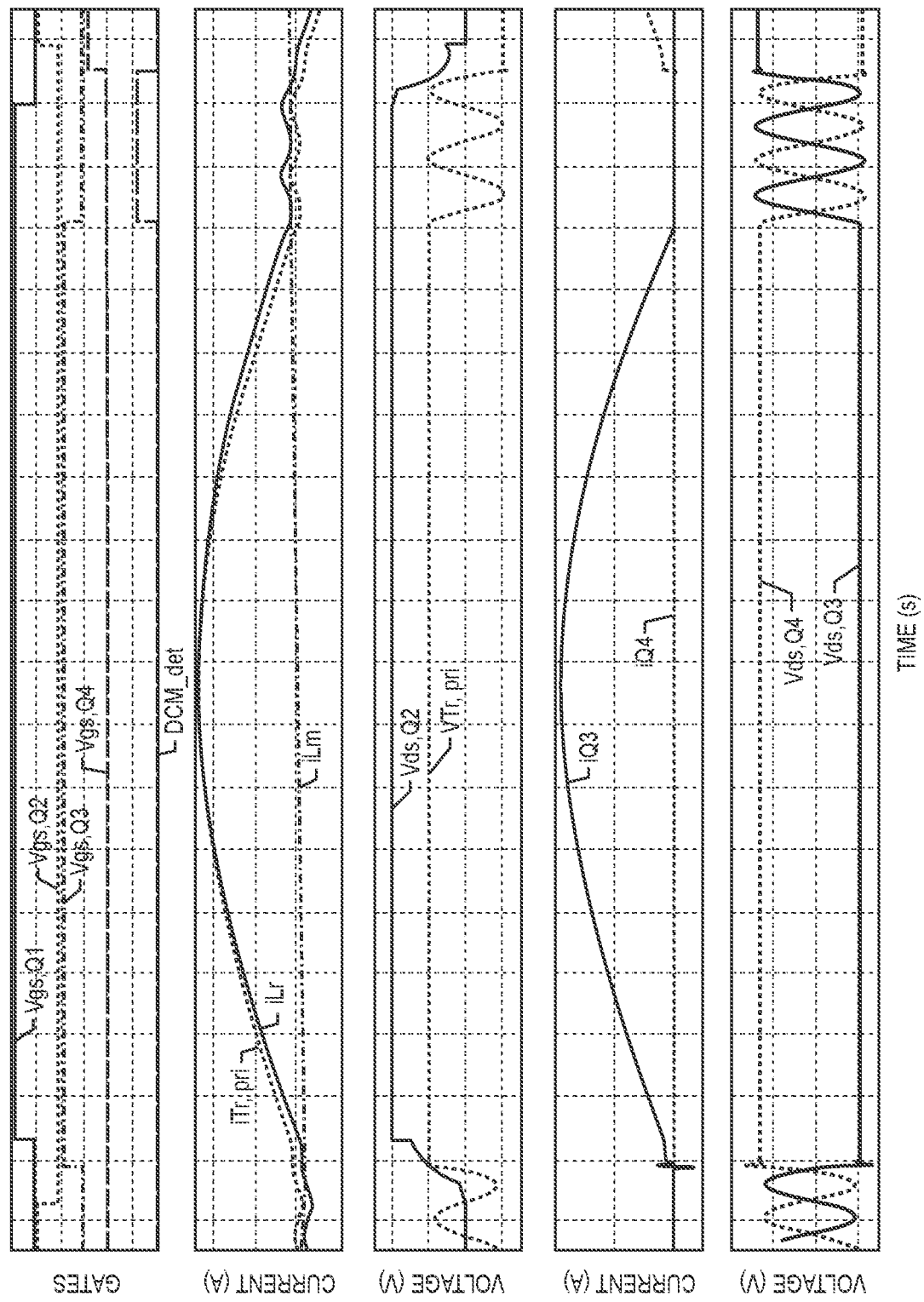

FIGS. 10 (above resonance) and 11 (under resonance) illustrate that the DCM detection technique described herein may be a complement to the state machine shown in FIGS. 2 and 3. That is, for a first part of each switching cycle for the secondary-side switch network 108, the secondary-side digital control circuit 116 may detect DCM ('DCM_det') based on a falling edge ↓(Vsense<Vcmp) of the current sense signal Vsense occurring before a falling edge of the PWM drive signal for the first rectification branch 110. For a second part of each switching cycle for the secondary-side switch network 108, the secondary-side digital control circuit 116 may detect DCM for the second rectification branch 112 based on the falling edge ↓(Vsense<Vcmp) of the current sense signal Vsense occurring before a falling edge of the drive signal PWM for the second rectification branch 112.

The DCM detection may be used for several purposes, including: using the falling edge ↓(Vsense<Vcmp) of the comparator 120 instead of the rising edge ↑(Vsense<Vcmp) of the comparator 120 for triggering the SR gate pulses Vgs,Q3, Vgs,Q4 while in CCM, thereby improving the response time for very high frequency designs; and tracking the natural resonant frequency of the LLC converter. The secondary-side controller 116 may reset the DCM detection every switching cycle. Accordingly, the secondary-side controller 116 may detect the CCM/DCM operation mode cycle by cycle. As explained above, the secondary-side controller 116 may set a DCM/CCM flag for each of the SR branches 110, 112 independently. Also, the secondary-side controller 116 may extend the DCM detection window slightly further into the next PWM polarity, to account for the primary side driver and logic delays, e.g., as previously explained herein.

In the case where the current sense signal Vsense does not cross the comparison threshold Vcmp, the secondary-side controller 116 may reset the DCM logic after a configurable delay, e.g., one fourth of the primary side period. This is a protection mechanism to avoid incorrect trigger at very light load or due to malfunction of the current sense circuitry 118.

As shown in FIG. 1, the current sense circuitry 118 may include a current transformer 'CT' for sensing the switching current on the primary side or secondary side 102 of the LLC. The sensed current is rectified by a rectification bridge 122 and converted to a voltage by a sense resistor 'Rsense' that is amplified by an amplifier 124 to generate the current sense signal Vsense.

Figure 12:
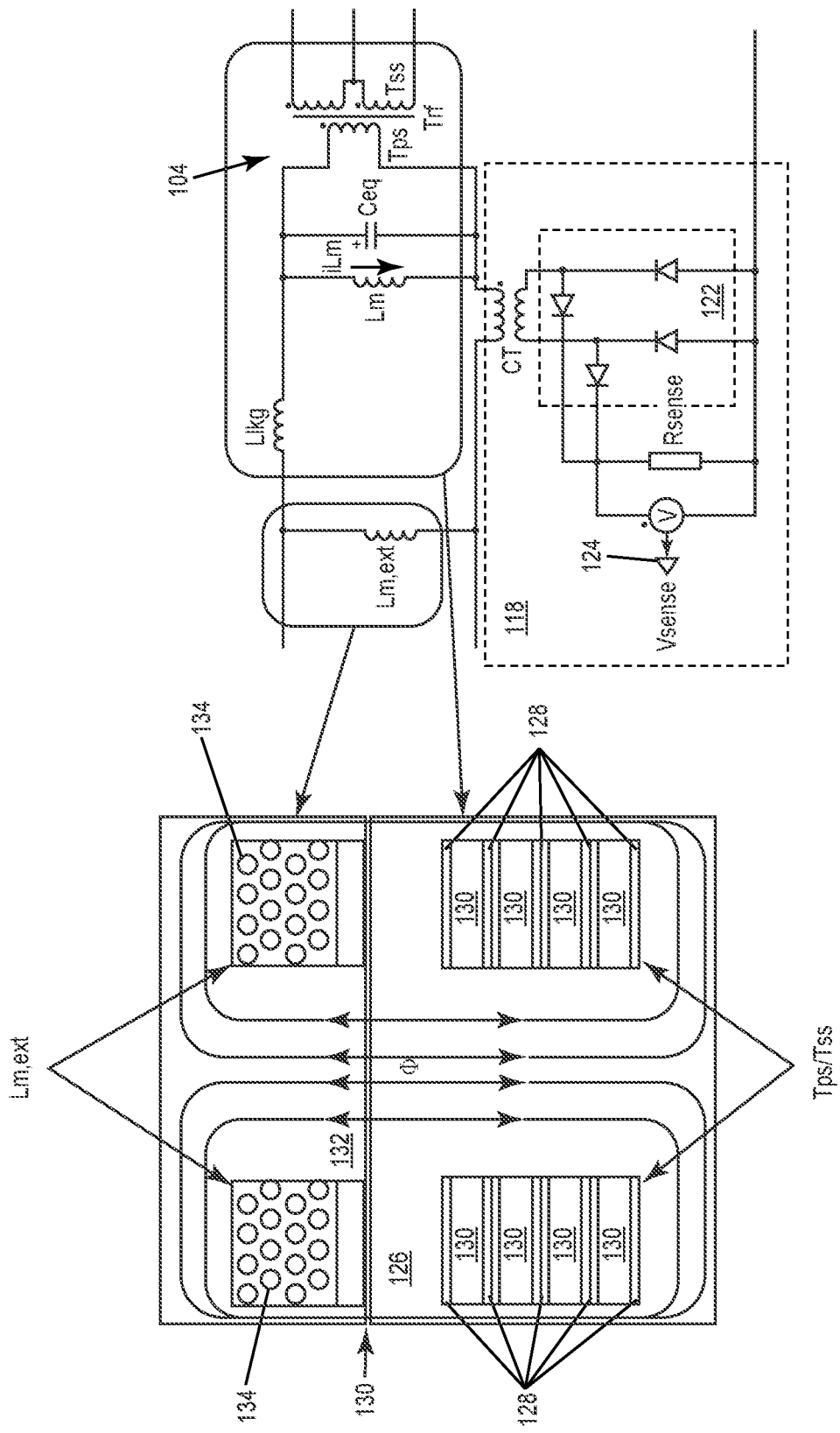
FIG. 12 illustrates a schematic of an embodiment of an isolation transformer, LLC network and current sense circuitry of the LLC converter.

FIG. 12 illustrates an embodiment of the isolation transformer 104, the LLC network $L_r$-$L_{m,ext}$-$L_{lkg}$-$L_m$-$C_{eq}$/$C_{r1,2}$-$T_{ps}$ and the current sense circuitry 118 of the LLC converter. According to this embodiment, the isolation transformer 104 includes a main body 126 such as a ferrite material. The first (primary side) winding Tps and the second (secondary side) winding Tss of the isolation transformer 104 are disposed in the main body 126. For example, the transformer windings Tps, Tss may be implemented in a planar manner, e.g., using PCB (printed circuit board) technology where secondary-side circuit board layers 128 are interleaved with primary-side circuit board layers 130.

Most of the transformer current being sensed passes through the external inductor Lm,ext of the LLC network $L_r$-$L_{m,ext}$-$L_{lkg}$-$L_m$-$C_{eq}$/$C_{r1,2}$-$T_{ps}$. Accordingly, the magnetizing current iLm does not need to be reconstructed because in this embodiment the external magnetizing inductor Lm,ext is much smaller than the magnetizing inductance Lm of the primary-side transformer winding Tps which is common for applications that use planar transformers where the gap causes high losses. The magnetizing inductance Lm of the primary-side transformer winding Tps may be at least an order of magnitude larger than the inductance of the resonant inductor Lm,ext. In one embodiment, the magnetizing inductance of the primary-side transformer winding Tps is at least 20 times larger than the inductance of the resonant inductor Lm,ext. For example, the magnetizing inductance Lm may be in the order of 1.5 mH while the external parallel inductor Lm,ext may be in the order of 65 pH. For each of these cases, the required magnetizing inductance is implemented with an external discrete inductor Lm,ext instead of being realized by the transformer magnetizing inductance Lm.

According to the embodiment illustrated in FIG. 12, the external resonant inductor Lm,ext in parallel with the first winding Tps of the isolation transformer 104 is disposed outside the main body 126, e.g., in another body 132. For example, the external resonant inductor Lm,ext may include a wound wire 134 a cross-section of which is shown in FIG. 12. FIG. 12 depicts a planar transformer configuration. However, other transformer configurations may be used such as toroidal, discrete/separate, etc.

In each case, the current transformer CT is positioned between the isolation transformer 104 and the external resonant inductor Lm,ext in FIG. 12 for generating the current sense signal Vsense. In the case where the main body 126 of the isolation transformer 104 includes circuit board layers 128, 130 which implement the secondary-side and primary-side windings Tss, Tps of the isolation transformer 104, and the external resonant inductor Lm,ext may be separated from the circuit board layers 128, 130 by a gap 136 such as an air gap. The current sensing technique described in connection with FIG. 12 may be used in combination with the control algorithm for accurate driving of the SRs (synchronous rectifiers) in resonant LLC converters described earlier. The current sensing technique instead may be used independently of the control algorithm.

Although the present disclosure is not so limited, the following numbered examples demonstrate one or more aspects of the disclosure.

Example 1. An LLC converter, comprising: a primary side coupled to a secondary side by an isolation transformer, the primary side comprising a primary-side switch network connected to an LLC network, the LLC network including a first winding of the isolation transformer, the secondary side comprising a secondary-side switch network having a first rectification branch and a second rectification branch coupled to different tap points of a second winding of the isolation transformer; a primary-side controller configured to control switching of the primary-side switch network; and a secondary-side controller configured to control switching of the secondary-side switch network, based on a drive signal provided by the primary-side controller and a current sense signal indicative of current in the first rectification branch and the second rectification branch, wherein for a first part of each switching cycle for the secondary-side switch network and after the second rectification branch is switched off, the secondary-side controller is configured to switch on the first rectification branch in either discontinuous conduction mode (DCM) when a rising edge of the current sense signal exceeds a threshold or in continuous conduction mode (CCM) when a falling edge of the current sense signal drops below the threshold, wherein for a second part of each switching cycle for the secondary-side switch network and after the first rectification branch is switched off, the secondary-side controller is configured to switch on the second rectification branch in either DCM when the rising edge of the current sense signal exceeds the threshold or in CCM when the falling edge of the current sense signal drops below the threshold.

Example 2. The LLC converter of example 1, wherein the isolation transformer comprises a main body, wherein the first winding of the isolation transformer is disposed in the main body, the LLC converter further comprising: a resonant inductor in parallel with the first winding of the isolation transformer and disposed outside the main body, wherein a magnetizing inductance of the first winding is larger than the inductance of the resonant inductor; and a current transformer positioned between the isolation transformer and the resonant inductor for generating the current sense signal.

Example 3. The LLC converter of example 2, wherein the magnetizing inductance of the first winding is at least an order of magnitude larger than the inductance of the resonant inductor.

Example 4. The LLC converter of example 2 or 3, wherein the magnetizing inductance of the first winding is at least 20 times larger than the inductance of the resonant inductor.

Example 5. The LLC converter of any of examples 2 through 4, wherein the main body of the isolation transformer comprises a plurality of circuit board layers which implement the first winding and the second winding of the isolation transformer, and wherein the resonant inductor is separated from the circuit board layers by a gap.

Example 6. The LLC converter of any of examples 1 through 5, wherein the secondary-side controller comprises a comparator configured to compare the current sense signal with the threshold, wherein the comparator is reset each switching cycle, wherein for the first part of each switching cycle, the secondary-side controller is configured to switch on the first rectification branch in DCM in response to a rising edge of an output of the comparator or in CCM in response to a falling edge of the output of the comparator, and wherein for the second part of each switching cycle, the secondary-side controller is configured to switch on the second rectification branch in DCM in response to the rising edge of the output of the comparator or in CCM in response to the falling edge of the output of the comparator.

Example 7. The LLC converter of any of examples 1 through 6, wherein the drive signal provided by the primary-side controller is a PWM (pulse width modulation) signal, wherein a same comparator is used by the secondary-side controller for detecting DCM or CCM for both the first rectification branch and the second rectification branch, and wherein the secondary-side controller is configured to reset the comparator based on a change in polarity in the PWM signal.

Example 8. The LLC converter of example 7, wherein the comparator has an enable window that corresponds to the polarity of the PWM signal, wherein the enable window has a programmable delay after a change in the polarity of the PWM signal, and wherein the enable window is blanked to avoid shot-through when transitioning from one of the rectification branches to the other one of the rectification branches.

Example 9. The LLC converter of any of examples 1 through 8, wherein the secondary-side controller is configured to detect DCM for the first rectification branch based on the falling edge of the current sense signal occurring before a falling edge of the drive signal for the first rectification branch, and wherein the secondary-side controller is configured to detect DCM for the second rectification branch based on the falling edge of the current sense signal occurring before a falling edge of the drive signal for the second rectification branch.

Example 10. The LLC converter of example 9, wherein the secondary-side controller is configured to track a resonance frequency of the LLC converter based on the DCM detection.

Example 11. The LLC converter of example 9 or 10, wherein the secondary-side controller comprises a comparator configured to compare the current sense signal with the threshold, wherein the comparator is reset each time the drive signal provided by the primary-side controller changes polarity, wherein the secondary-side controller is configured to detect DCM for the first rectification branch based on a falling edge of an output of the comparator occurring before the falling edge of the drive signal for the first rectification branch, and wherein the secondary-side controller is configured to detect DCM for the second rectification branch based on the falling edge of the output of the comparator occurring before the falling edge of the drive signal for the second rectification branch.

Example 12. The LLC converter of any of examples 9 through 11, wherein the secondary-side controller is configured to reset the comparator each switching cycle after the drive signal provided by the primary-side controller changes polarity.

Example 13. The LLC converter of any of examples 9 through 12, wherein the secondary-side controller comprises a separate flag for the first rectification branch and the second rectification branch, and wherein the secondary-side controller is configured to independently set the separate flag for each rectification branch to indicate if DCM is detected for that rectification branch.

Example 14. The LLC converter of any of examples 1 through 13, wherein the secondary-side controller is configured to reset detection of DCM or CCM if the current sense signal does not exceed the threshold during a switching cycle.

Example 15. A secondary-side controller for an LLC converter, the secondary-side controller comprising: a first input configured to receive a drive signal from a primary-side controller of the LLC converter; a second input configured to receive a current sense signal indicative of current in a first rectification branch and a second rectification branch of a secondary-side switch network of the LLC converter; and a digital control circuit configured to control switching of the secondary-side switch network, based on the drive signal received at the first input and the current sense signal received at the second input, wherein for a first part of each switching cycle for the secondary-side switch network and after the second rectification branch is switched off, the digital control circuit is configured to switch on the first rectification branch in either discontinuous conduction mode (DCM) when a rising edge of the current sense signal exceeds a threshold or in continuous conduction mode (CCM) when a falling edge of the current sense signal drops below the threshold, wherein for a second part of each switching cycle for the secondary-side switch network and after the first rectification branch is switched off, the digital control circuit is configured to switch on the second rectification branch in either DCM when the rising edge of the current sense signal exceeds the threshold or in CCM when the falling edge of the current sense signal drops below the threshold.

Example 16. The secondary-side controller of example 15, wherein the digital control circuit is configured to detect DCM or CCM based on the falling edge of the current sense signal occurring before a falling edge of the drive signal for one of the rectification branches or based on the falling edge of the current sense signal occurring before a rising edge of the drive signal for the other one of the rectification branches.

Example 17. An LLC converter, comprising: a primary side coupled to a secondary side by an isolation transformer, the primary side comprising a primary-side switch network connected to an LLC network, the LLC network including a first winding of the isolation transformer, the secondary side comprising a secondary-side switch network having a first rectification branch and a second rectification branch coupled to different tap points of a second winding of the isolation transformer; a primary-side controller configured to control switching of the primary-side switch network; and a secondary-side controller configured to control switching of the secondary-side switch network, based on a drive signal provided by the primary-side controller and a current sense signal indicative of current in the first rectification branch and the second rectification branch, wherein for a first part of each switching cycle for the secondary-side switch network, the secondary-side controller is configured to detect discontinuous conduction mode (DCM) based on a falling edge of the current sense signal occurring before a falling edge of the drive signal for the first rectification branch, wherein for a second part of each switching cycle for the secondary-side switch network, the secondary-side controller is configured to detect DCM for the second rectification branch based on the falling edge of the current sense signal occurring before a falling edge of the drive signal for the second rectification branch.

Example 18. The LLC converter of example 17, wherein the secondary-side controller is configured to track a resonance frequency of the LLC converter based on the DCM detection.

Example 19. The LLC converter of example 17 or 18, wherein the secondary-side controller comprises a comparator configured to compare the current sense signal with the threshold, wherein the comparator is reset each time the drive signal provided by the primary-side controller changes polarity, wherein the secondary-side controller is configured to detect DCM for the first rectification branch based on a falling edge of an output of the comparator occurring before the falling edge of the drive signal for the first rectification branch, and wherein the secondary-side controller is configured to detect DCM for the second rectification branch based on the falling edge of the output of the comparator occurring before the falling edge of the drive signal for the second rectification branch.

Example 20. The LLC converter of any of examples 17 through 19, wherein the secondary-side controller is configured to reset the comparator each switching cycle after the drive signal provided by the primary-side controller changes polarity.

Example 21. The LLC converter of any of examples 17 through 20, wherein the secondary-side controller comprises a separate flag for the first rectification branch and the second rectification branch, and wherein the secondary-side controller is configured to independently set the separate flag for each rectification branch to indicate if DCM is detected for that rectification branch.

Example 22. A secondary-side controller for an LLC converter, the secondary-side controller comprising: a first input configured to receive a drive signal from a primary-side controller of the LLC converter; a second input configured to receive a current sense signal indicative of current in a first rectification branch and a second rectification branch of a secondary-side switch network of the LLC converter; and a digital control circuit configured to control switching of the secondary-side switch network, based on the drive signal received at the first input and the current sense signal received at the second input, wherein for a first part of each switching cycle for the secondary-side switch network, the digital control circuit is configured to detect discontinuous conduction mode (DCM) based on a falling edge of the current sense signal occurring before a falling edge of the drive signal for the first rectification branch, wherein for a second part of each switching cycle for the secondary-side switch network, the digital control circuit is configured to detect DCM for the second rectification branch based on the falling edge of the current sense signal occurring before a falling edge of the drive signal for the second rectification branch.

Terms such as "first", "second", and the like, are used to describe various elements, regions, sections, etc. and are also not intended to be limiting. Like terms refer to like elements throughout the description.

As used herein, the terms "having", "containing", "including", "comprising" and the like are open ended terms that indicate the presence of stated elements or features, but do not preclude additional elements or features. The articles "a", "an" and "the" are intended to include the plural as well as the singular, unless the context clearly indicates otherwise.

It is to be understood that the features of the various embodiments described herein may be combined with each other, unless specifically noted otherwise.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:
1. An LLC converter, comprising:
a primary side coupled to a secondary side by an isolation transformer, the primary side comprising a primary-side switch network connected to an LLC network, the LLC network including a first winding of the isolation transformer, the secondary side comprising a secondary-side switch network having a first rectification branch and a second rectification branch coupled to different tap points of a second winding of the isolation transformer;
a primary-side controller configured to control switching of the primary-side switch network; and
a secondary-side controller configured to control switching of the secondary-side switch network, based on a drive signal provided by the primary-side controller and a current sense signal indicative of current in the first rectification branch and the second rectification branch,
wherein for a first part of each switching cycle for the secondary-side switch network and after the second rectification branch is switched off, the secondary-side controller is configured to switch on the first rectification branch in either discontinuous conduction mode (DCM) when a rising edge of the current sense signal exceeds a threshold or in continuous conduction mode (CCM) when a falling edge of the current sense signal drops below the threshold,
wherein for a second part of each switching cycle for the secondary-side switch network and after the first rectification branch is switched off, the secondary-side controller is configured to switch on the second rectification branch in either DCM when the rising edge of the current sense signal exceeds the threshold or in CCM when the falling edge of the current sense signal drops below the threshold.

2. The LLC converter of claim 1, wherein the isolation transformer comprises a main body, wherein the first winding of the isolation transformer is disposed in the main body, the LLC converter further comprising:
   a resonant inductor in parallel with the first winding of the isolation transformer and disposed outside the main body, wherein a magnetizing inductance of the first winding is larger than an inductance of the resonant inductor; and
   a current transformer positioned between the isolation transformer and the resonant inductor for generating the current sense signal.

3. The LLC converter of claim 2, wherein the magnetizing inductance of the first winding is at least an order of magnitude larger than the inductance of the resonant inductor.

4. The LLC converter of claim 2, wherein the main body of the isolation transformer comprises a plurality of circuit board layers which implement the first winding and the second winding of the isolation transformer, and wherein the resonant inductor is separated from the circuit board layers by a gap.

5. The LLC converter of claim 1, wherein the secondary-side controller comprises a comparator configured to compare the current sense signal with the threshold, wherein the comparator is reset each switching cycle, wherein for the first part of each switching cycle, the secondary-side controller is configured to switch on the first rectification branch in DCM in response to a rising edge of an output of the comparator or in CCM in response to a falling edge of the output of the comparator, and wherein for the second part of each switching cycle, the secondary-side controller is configured to switch on the second rectification branch in DCM in response to the rising edge of the output of the comparator or in CCM in response to the falling edge of the output of the comparator.

6. The LLC converter of claim 1, wherein the drive signal provided by the primary-side controller is a PWM (pulse width modulation) signal, wherein a same comparator is used by the secondary-side controller for detecting DCM or CCM for both the first rectification branch and the second rectification branch, and wherein the secondary-side controller is configured to reset the comparator based on a change in polarity in the PWM signal.

7. The LLC converter of claim 6, wherein the comparator has an enable window that corresponds to the polarity of the PWM signal, wherein the enable window has a programmable delay after a change in the polarity of the PWM signal, and wherein the enable window is blanked to avoid shot-through when transitioning from one of the rectification branches to the other one of the rectification branches.

8. The LLC converter of claim 1, wherein the secondary-side controller is configured to detect DCM for the first rectification branch based on the falling edge of the current sense signal occurring before a falling edge of the drive signal for the first rectification branch, and wherein the secondary-side controller is configured to detect DCM for the second rectification branch based on the falling edge of the current sense signal occurring before a falling edge of the drive signal for the second rectification branch.

9. The LLC converter of claim 8, wherein the secondary-side controller is configured to track a resonance frequency of the LLC converter based on the DCM detection.

10. The LLC converter of claim 8, wherein the secondary-side controller comprises a comparator configured to compare the current sense signal with the threshold, wherein the comparator is reset each time the drive signal provided by the primary-side controller changes polarity, wherein the secondary-side controller is configured to detect DCM for the first rectification branch based on a falling edge of an output of the comparator occurring before the falling edge of the drive signal for the first rectification branch, and wherein the secondary-side controller is configured to detect DCM for the second rectification branch based on the falling edge of the output of the comparator occurring before the falling edge of the drive signal for the second rectification branch.

11. The LLC converter of claim 8, wherein the secondary-side controller is configured to reset the comparator each switching cycle after the drive signal provided by the primary-side controller changes polarity.

12. The LLC converter of claim 8, wherein the secondary-side controller comprises a separate flag for the first rectification branch and the second rectification branch, and wherein the secondary-side controller is configured to independently set the separate flag for each rectification branch to indicate if DCM is detected for that rectification branch.

13. The LLC converter of claim 1, wherein the secondary-side controller is configured to reset detection of DCM or CCM if the current sense signal does not exceed the threshold during a switching cycle.

14. A secondary-side controller for an LLC converter, the secondary-side controller comprising:
   a first input configured to receive a drive signal from a primary-side controller of the LLC converter;
   a second input configured to receive a current sense signal indicative of current in a first rectification branch and a second rectification branch of a secondary-side switch network of the LLC converter; and
   a digital control circuit configured to control switching of the secondary-side switch network, based on the drive signal received at the first input and the current sense signal received at the second input,
   wherein for a first part of each switching cycle for the secondary-side switch network and after the second rectification branch is switched off, the digital control circuit is configured to switch on the first rectification branch in either discontinuous conduction mode (DCM) when a rising edge of the current sense signal exceeds a threshold or in continuous conduction mode (CCM) when a falling edge of the current sense signal drops below the threshold,
   wherein for a second part of each switching cycle for the secondary-side switch network and after the first rectification branch is switched off, the digital control circuit is configured to switch on the second rectification branch in either DCM when the rising edge of the current sense signal exceeds the threshold or in CCM when the falling edge of the current sense signal drops below the threshold.

15. The secondary-side controller of claim 14, wherein the digital control circuit is configured to detect DCM or CCM based on the falling edge of the current sense signal occurring before a falling edge of the drive signal for one of the rectification branches or based on the falling edge of the current sense signal occurring before a rising edge of the drive signal for the other one of the rectification branches.

16. An LLC converter, comprising:
   a primary side coupled to a secondary side by an isolation transformer, the primary side comprising a primary-side switch network connected to an LLC network, the LLC network including a first winding of the isolation transformer, the secondary side comprising a secondary-side switch network having a first rectification branch and a second rectification branch coupled to different tap points of a second winding of the isolation transformer;

a primary-side controller configured to control switching of the primary-side switch network; and a secondary-side controller configured to control switching of the secondary-side switch network, based on a drive signal provided by the primary-side controller and a current sense signal indicative of current in the first rectification branch and the second rectification branch, wherein for a first part of each switching cycle for the secondary-side switch network, the secondary-side controller is configured to detect discontinuous conduction mode (DCM) based on a falling edge of the current sense signal occurring before a falling edge of the drive signal for the first rectification branch, wherein for a second part of each switching cycle for the secondary-side switch network, the secondary-side controller is configured to detect DCM for the second rectification branch based on the falling edge of the current sense signal occurring before a falling edge of the drive signal for the second rectification branch.

17. The LLC converter of claim 16, wherein the secondary-side controller is configured to track a resonance frequency of the LLC converter based on the DCM detection.

18. The LLC converter of claim 16, wherein the secondary-side controller comprises a comparator configured to compare the current sense signal with the threshold, wherein the comparator is reset each time the drive signal provided by the primary-side controller changes polarity, wherein the secondary-side controller is configured to detect DCM for the first rectification branch based on a falling edge of an output of the comparator occurring before the falling edge of the drive signal for the first rectification branch, and wherein the secondary-side controller is configured to detect DCM for the second rectification branch based on the falling edge of the output of the comparator occurring before the falling edge of the drive signal for the second rectification branch.

19. The LLC converter of claim 16, wherein the secondary-side controller is configured to reset the comparator each switching cycle after the drive signal provided by the primary-side controller changes polarity.

20. The LLC converter of claim 16, wherein the secondary-side controller comprises a separate flag for the first rectification branch and the second rectification branch, and wherein the secondary-side controller is configured to independently set the separate flag for each rectification branch to indicate if DCM is detected for that rectification branch.

* * * * *